MULTIPLE STATION TAPE HANDLING APPARATUS

Filed Jan. 19, 1967

INVENTORS.
HARRY F. RAYFIELD
MAGNE JARLE KJOS
BY
Christie, Parker & Hale
ATTORNEYS.

INVENTORS.
HARRY F. RAYFIELD
MAGNE JARLE KJOS
BY
Christie, Parker & Hale
ATTORNEYS.

INVENTORS.
HARRY F. RAYFIELD
MAGNE JARLE KJOS
BY
Christie, Parker & Hale
ATTORNEYS.

United States Patent Office 3,443,766
Patented May 13, 1969

3,443,766
MULTIPLE STATION TAPE HANDLING APPARATUS

Harry F. Rayfield, Bradbury, and Magne Jarle Kjos, Duarte, Calif., assignors to Burroughs Corporation, Detroit, Mich., a corporation of Michigan Filed Jan. 19, 1967, Ser. No. 610,257
Int. Cl. G11b *15/44*
U.S. Cl. 242—55.12 20 Claims

ABSTRACT OF THE DISCLOSURE

Improvements in multiple station tape handling apparatus, particularly of the type involving coaxially arranged reels. A criterion is involved for locating and orienting cylindrical tape guiding elements on a work surface so as to guide tape from reels canted at an angle with respect to the work surface without exerting axial forces on the tape. In addition, a supporting structure is shock-mounted to a fixed frame and comprises a rigid, tubular hub from which rigid beams extend radially. Reel drive assemblies are mounted on the beams and a deck plate, along which the tape is transported, is mounted on the end of the hub. The drive assembly comprises coaxially arranged shafts that are supported by a novel bearing arrangement.

This invention relates to tape handling apparatus and, more particularly, to apparatus particularly adapted for use in a multiple station tape handling system.

A patent application of Harry F. Rayfield, Ser. No. 459,625, filed May 28, 1965, and entitled "Tape Apparatus," which issued as Patent 3,345,007, on Oct. 3, 1967 discloses multiple station tape handling apparatus in which each of four pairs of tape storage reels is coaxially arranged. Magnetic tape is guided between the reels of each pair and a common work surface along which the tape is driven past a transducer. Each station has a pair of orthogonally situated vacuum columns. The vacuum column pairs of the stations are arranged side by side in the form of a cross that defines four quadrants. One pair of coaxially arranged reels is located in each quadrant.

When a pair of reels is arranged coaxially, it is not possible to place both of the reels so the tape travels between them and past a transducer all in a single plane. In other words, it is necessary in part to guide the tape in a direction parallel to its width to change tape travel from one plane to another. Patent 2,732,144 issued Jan. 24, 1956, to U. M. Jones, discloses a single pair of coaxially arranged reels that are canted with respect to the work surface along which tape is transported past a transducer. Tape from the upper reel extends downward toward the work surface, while tape from the lower reel extends upward towards the work surface. By so canting the reels, the tape is twisted less in bringing it onto the work surface than would be the case if the reels were parallel to the work surface and a more gradual transition from one plane to another were to take place.

Cylindrical rollers are often preferred over stationary cylindrical posts as tape guiding elements in tape handling systems because less wear results on the surface of the tape. As the tape passes over the surface of the rollers between the reel and the work surface in the above-described Jones arrangement, a force is exerted on the tape that causes the tape to creep axially relative to the rollers, so flanges must be provided on the rollers to prevent the tape from sliding out of the desired path. Although the flanges hold the tape in position relative to the rollers, the constant contact between the flanges and the tape results in substantial tape wear.

Most tape handling apparatus used in the digital computer technology utilizes separate motors to drive each tape storage reel of a pair. Only in this way can the tape be started and stopped at the high speeds demanded by present day computers. Conventionally, the reel drive motors are independently actuated by sensors that are responsive to the length of the tape loops in the vacuum columns associated with the pair of reels. In a coaxial reel arrangement, therefore, a drive assembly must be provided that will rotate each reel independent of the other reel. The most convenient place to mount the reel drive motors is on the underside of the deck plate forming the work surface. This practice, however, subjects the deck plate to large transverse forces as the motors stop and start, which deflect the common work surface. In tape handling apparatus, it is generally desirable to maintain the deck plate perfectly flat because the tape guiding elements, transducers, capstans, and other components are mounted thereon. The deflection problem is compounded in multiple station tape handling apparatus, since a plurality of pairs of motors are all operating at the same time.

According to one aspect of the invention, a criterion is given for establishing the position and orientation of two cylindrical elements, such as rollers, to guide tape between a work surface and a tape storage reel canted with respect to the surface without exerting axial force on the tape. Specifically, one element is oriented with its axis perpendicular to the plane in which the center of the tape on the reel lies. The other element is oriented with its axis perpendicular to the plane in which the center line of the tape on the work surface lies. The two elements are spaced apart and located near the line of intersection of the two planes such that the center line of the tape extending between the two elements coincides substantially with the line of intersection of the two planes. When this criterion is followed, the transition of tape travel from one plane to the other is accomplished without exertion of axial force on the tape. If the elements are rollers, no flanges are required to prevent the tape from creeping axially along the roller.

In another aspect of the invention, the coaxially arranged reels are coupled to their respective motors by a coaxial drive assembly that has an inner shaft and a hollow outer shaft in axial alignment with one another. Axial alignment between two shafts is maintained by a pair of bearings at either end of the outer shaft adapted to permit relative rotation between the shafts. The inner shaft extends beyond the outer shaft at one end to permit transmission of power to the inner shaft. A bearing supports the outer shaft in relatively rotatable relationship with respect to the frame and another bearing supports the inner shaft in relatively rotatable relationship with respect to the frame. Power is transmitted to the inner shaft between the latter bearing and the end of the outer shaft. By virtue of this supporting configuration, the coaxial drive arrangement employs the least possible number of bearings and the inner shaft experiences little transverse deflection even though subjected to large torque.

The motors for driving the coaxially arranged reels are mounted on a spider-like supporting structure that is shock-mounted to the stationary frame of the tape handling apparatus. The supporting structure comprises a rigid tubular hub to which a plurality of radially extending beams are welded. One beam is provided for each station. The motors and the coaxial drive assembly for each station are mounted on a beam such that the motors are balanced on either side of it. The deck plate that forms the work surface is mounted on the top edge of the hub, which also serves as a reservoir between the vacuum columns mounted on the deck plate and a vacuum pump. Because the supporting structure is shock-mounted, the forces to which the frame is subjected are felt by the components of the tape handling apparatus in greatly diminished magnitude. The beams are designed to withstand large transverse forces without substantial deflection. As a result of this and the fact that the deck plate forming the work surface is only indirectly connected to the motors through the rigid hub and the beams, the motors do not deflect the deck plate appreciably.

These and other features of the invention are considered further in the following detailed description taken in conjunction with the drawings, in which.

Figure 1:
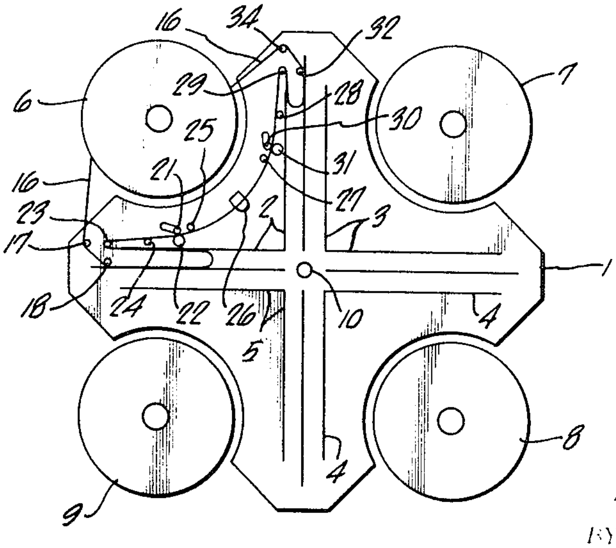
FIG. 1 is a top view of multiple station tape handling apparatus.
Figure 2:
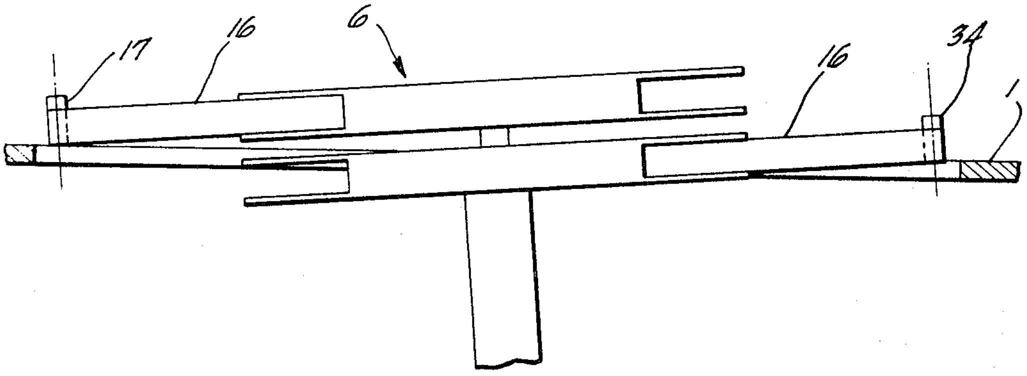
FIG. 2 is a side elevation view of a pair of coaxially arranged reels canted with respect to a deck plate.

In FIG. 1, multiple station tape handling apparatus of the type disclosed in the above-mentioned Patent 3,345,007 is represented in a top view. A common work surface along which tape passes is formed by the top of a deck plate 1. Pairs 2, 3, 4, and 5 of orthogonally situated vacuum columns are arranged side by side in the form of a cross that divides the tape handling apparatus into quadrants. An opening 10 in deck plate 1 at the intersection of vacuum column pairs 2, 3, 4, and 5 leads to a vacuum pump not shown in FIG. 1. Pairs 6, 7, 8, and 9 of coaxially arranged tape storage reels are situated in the quadrants adjacent vacuum column pairs 2, 3, 4, and 5, respectively. As illustrated in FIG. 2, each pair of coaxially arranged reels is canted with respect to deck plate 1, one reel lying above and the other reel lying below deck plate 1. Tape from the upper reel extends downwardly toward the common work surface, while tape from the lower reel extends upwardly toward the common work surface.

For the sake of simplicity, only the tape handling elements associated with reel pair 6 are illustrated in FIG. 1. The tape handling elements associated with reel pairs 7, 8, and 9 would be identical to those shown for reel pair 6. Tape, designated 16 in FIGS. 1 and 2, extends from the top reel of pair 6 around rollers 17 and 18, which are mounted on the work surface of deck plate 1, and into one vacuum column of pair 2, where it forms a slack loop. After the tape leaves roller 18, it is perpendicular to deck plate 1 so it can be transported easily along the common work surface. From the vacuum column, the tape is guided between a pivotable pinch roller 21 and a capstan 22 by rollers 23 and 24. A roller 25 guides the tape to a transducer 26. After passing across transducer 26, the tape is guided between a pivotable pinch roller 30 and a capstan 31 by rollers 27, 28, and 29 and into the other vacuum column of pair 2 in which the tape forms a slack loop. Rollers 32 and 34 guide the tape to the bottom reel of pair 6.

In the course of tape transport, the tape winding and unwinding from the reels of pair 6 is traveling in a plane which is canted with respect to the common work surface at the same angle that the reels of pair 6 are canted. Rollers 17 and 18 effect a transition of the direction of tape travel from a plane parallel to the upper reel of pair 6 to a plane parallel to the common work surface. Similarly, rollers 32 and 34 effect a transition of the direction of tape travel from a plane parallel to the lower reel of pair 6 to a plane parallel to the common work surface. Rollers 17 and 18 and rollers 32 and 34 are so placed and oriented that they exert no force parallel to their axis on the tape passing over them. As a result, the lateral position of the tape passing over these rollers is maintained without benefit of flanges or other restraining members that would increase tape wear.

Figure 3A:
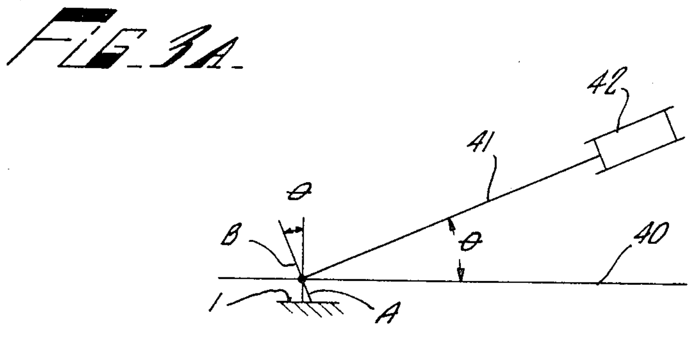
FIGS. 3A and 3B are side elevation and top views, respectively, of a model that illustrates the criterion for placing tape guiding elements in accordance with the invention.
Figure 3B:
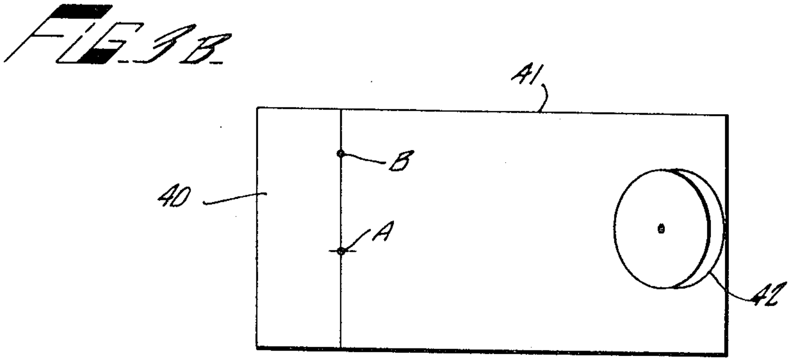

FIGS. 3A and 3B illustrate the placement and orientation of rollers required to satisfy this criterion. The center of the tape on the common work surface lies in a plane 40, which is parallel to the common work surface of deck plate 1. The center line of the tape on a canted reel designated 42 lies in a plane 41, which is canted at an angle $\theta$ with respect to plane 40. The tape, which is not represented in FIGS. 3A and 3B, extends from reel 42 to a roller, whose axis of rotation is represented by line A. The axis of rotation of roller A is perpendicular to plane 41. From roller A, the tape extends to a roller, whose axis of rotation is represented by line B. The axis of rotation of roller B is perpendicular to plane 40. Rollers A and B are so mounted on deck plate 1 that the center line of the portion of the tape extending between them coincides with the line of intersection of planes 40 and 41. The center line of the tape is understood to mean a line parallel to the length of the tape and midway between the edges of the tape. Consequently, the distances of travel of the top and the bottom edges of the tape between the two rollers are identical. Rollers A and B correspond to rollers 17 and 18 or 32 and 34 in FIG. 1. Since the reels of each pair are parallel, the line between rollers 17 and 18 is also parallel to the line between rollers 32 and 34. The angle of twist of the tape between the two rollers equals the angle $\theta$ at which the reel is canted. For this reason, it is generally desirable to cant the pairs of reels at as small an angle as is practicable. In one specific embodiment, an angle of 3½ degrees was found suitable. Stationary cylindrical posts could be substituted for any or all of rollers 17, 18, 32, and 34 without causing lateral movement of the tape.

Figure 5:
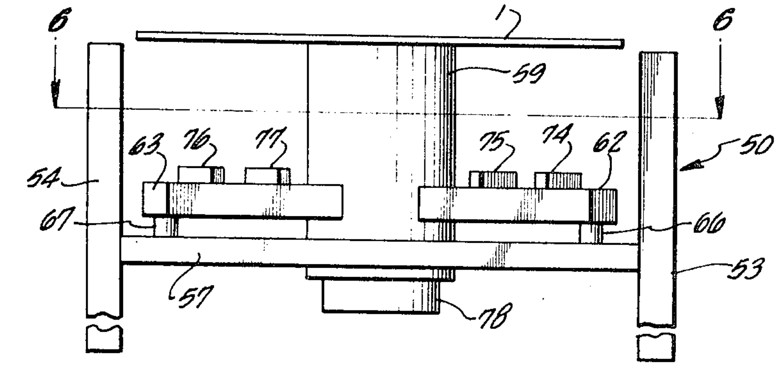
FIG. 5 is a side elevation view of the supporting structure of the invention mounted on a stationary frame.
Figure 6:
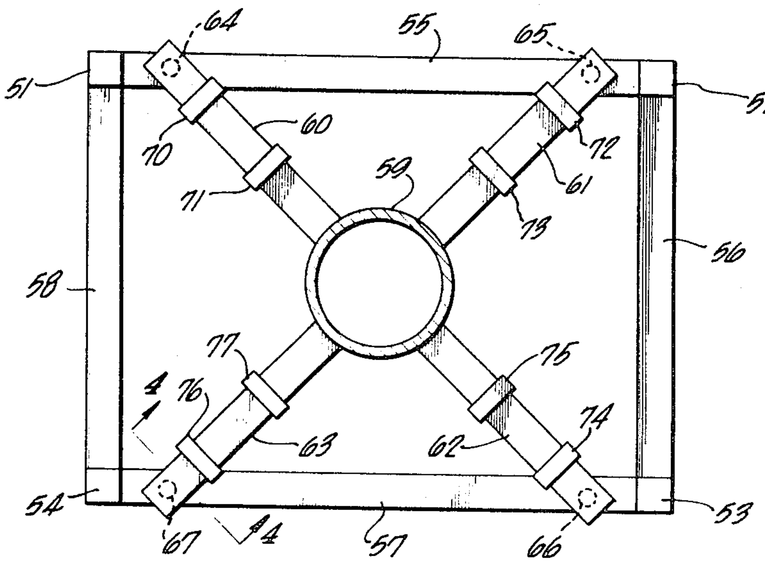
FIG. 6 is a top view in section of the frame and supporting structure of FIG. 5.

In FIGS. 5 and 6, an arrangement is shown for mounting the components of multiple station tape handling apparatus on a stationary frame 50. Frame 50, which would sit on the floor, has vertical members 51, 52, 53, and 54 and horizontal members 55, 56, 57, and 58. In mounting the pairs of coaxially arranged reels, it is important that the angle $\theta$ at which they are canted with respect to deck plate 1 remains substantially constant in the course of operation because, as mentioned above, the location and orientation of rollers 17, 18, 32, and 34 depend on this angle. Furthermore, it is important that deck plate 1 itself remains substantially flat and is not subjected to lateral deflection during the course of operation since the guide elements, transducers, and capstans are mounted thereon. To meet these requirements, a supporting structure comprising a rigid, tubular hub 59 is provided from which rigid beams 60, 61, 62, and 63 extend radially. At one end, beams 60, 61, 62, and 63 are welded to hub 59 and, at the other end, they are shock-mounted to frame 50 by vibration isolators 64, 65, 66, and 67, respectively. Pads 70 and 71, 72 and 73, 74 and 75, and 76 and 77 are attached to beams 60, 61, 62, and 63, respectively. The top bearing surface of pads 70 through 77 all lie in a common horizontal plane. Each drive assembly for one pair of coaxially arranged reels (discussed in detail hereafter in connection with FIG. 4) rests on a different pair of pads. Deck plate 1 rests on the end of hub 59. To establish the precise angular relationship between the coaxially arranged reels and deck plate 1, the top surface of pads 70 through 77 could all be machined at a single horizontal setting, which would then be raised to machine the end surface of hub 59. A vacuum pump 78 is attached to the bottom of hub 59 which then serves as a reservoir for air withdrawn from the vacuum columns mounted on deck plate 1 through opening 10.

Figure 4:
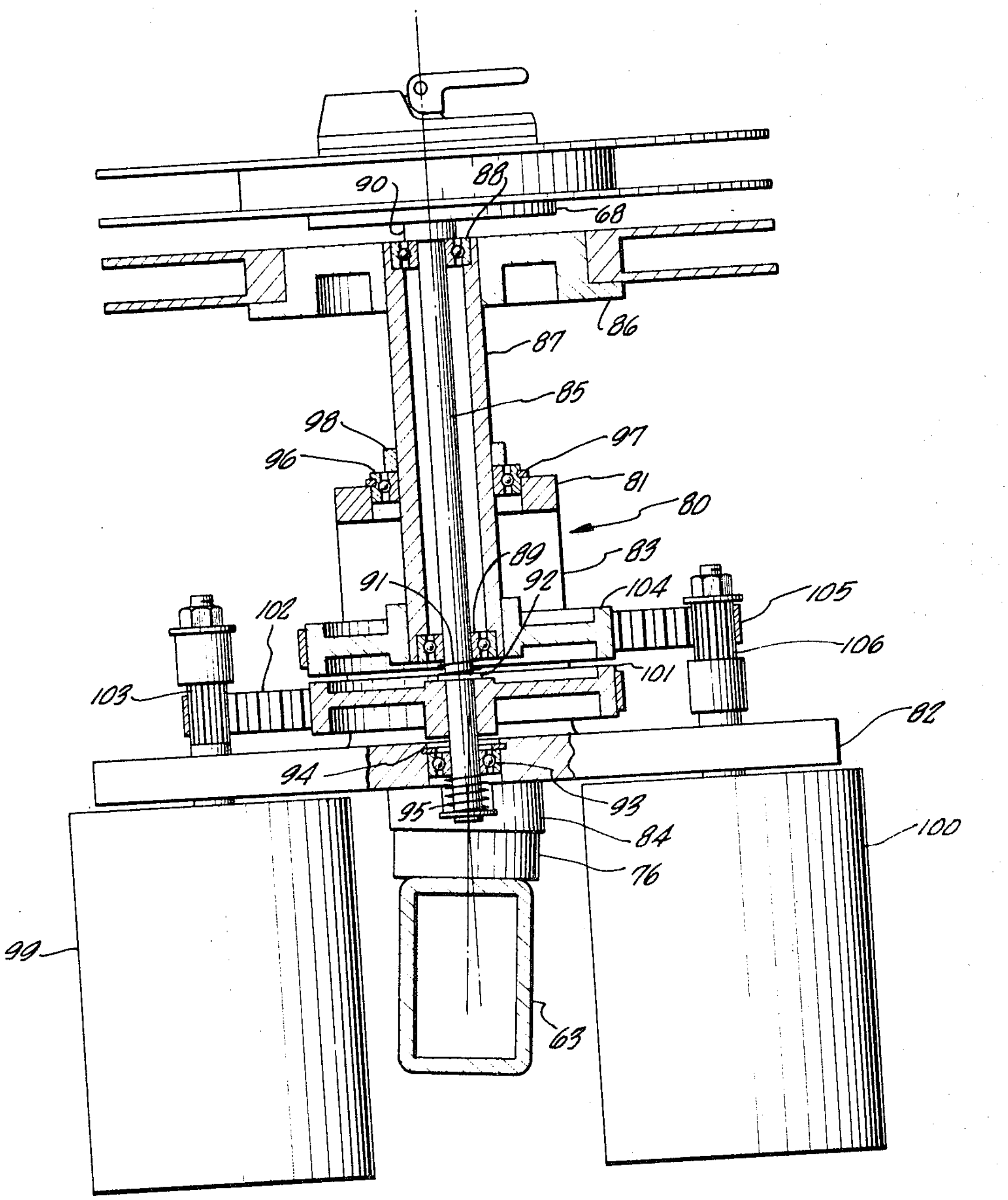
FIG. 4 is a side elevation view partially in section of the coaxial drive assembly of the invention mounted with motors for a pair of reels on a beam of the supporting structure of the invention.

FIG. 4 shows the drive assembly for one pair of coaxially arranged reels. A U-shaped support bracket 80 is provided having horizontal portions 81 and 82 connected by a vertical portion 83. A sloped pad 84 is fixed to the underside of portion 82. Pad 84 is secured to pad 76 on beam 63. Another sloped pad similar to pad 84 is secured to pad 77. As a result, portion 82 extends on either side of beam 63 and is canted at the angle prescribed for the associated pair of coaxially arranged reels. An upper reel mount 68 is attached to one end of an inner shaft 85, and a lower reel mount 86 is fastened to one end of a hollow outer shaft 87. Shafts 85 and 87 are held in relatively rotatable relationship and in axial alignment with respect to one another by bearings 88 and 89 located at either end of outer shaft 87. Bearing 88 is held in position by a spacer 90. Bearing 89 is held in place by a spring 91, which is seated on a retaining ring 92. At one end, inner shaft 85 is rotatably mounted in portion 82 by a bearing 93, which is held in position by a retaining ring 94 and a compression spring 95. Outer shaft 87 is rotatably mounted in portion 81 by a bearing 96, which is held in place by a retaining ring 97 and a washer 98. Thus, inner shaft 85 and outer shaft 87 are each supported by bracket 80 at one point. This is sufficient, however, to permit their axial movement because they are supported in axial alignment by bearings 88 and 89.

Servomotors 99 and 100 are secured underneath portion 82 in balanced relationship on opposite sides of beam 63. A pulley 101 is fixed to shaft 85. A belt 102 couples a shaft 103 of motor 99 to pulley 101. Since power is applied to shaft 85 at a point between bearings 89 and 93, very little deflection of shaft 85 takes place even with frequent and sudden motor starts and stops. A pulley 104 is fastened to shaft 87. A belt 105 couples a shaft 106 of motor 100 to pulley 104. Pulleys 101 and 104, belts 102 and 105, and shafts 103 and 106 are splined to insure positive coupling of rotation between motors 99 and 100 and shafts 85 and 87, respectively.

The features disclosed and claimed in a copending application of Harold E. Hass, Robert G. Nordman, and Harry F. Rayfield, Ser. No. 535,764, entitled "Vacuum System for Multiple Station Tape Handling Apparatus," filed on Mar. 21, 1966, and assigned to the assignee of the present application, which matured into Patent 3,379,352, on Apr. 23, 1968, could also be employed to advantage in conjunction with the features of the present invention.

What is claimed is:

1. In a multiple station tape handling system the combination comprising: a common work surface; a plurality of pairs of coaxially arranged tape storage reels, each pair being canted at an angle with respect to the common work surface such that tape extends upwardly from one reel toward the common work surface and tape extends downwardly from the other reel toward the common work surface; means individual to each pair of reels for guiding tape along the common work surface; and a pair of cylindrical elements individual to each reel for guiding tape between the reel and the common work surface, one of the elements being oriented perpendicular to the plane in which the center line of the tape on the reel lies, the other element being oriented perpendicular to the plane in which the center line of the tape guided along the common work surface lies, and both elements being located such that the center line of the tape extending between the elements substantially coincides with the line of intersection of the planes.

2. The combination of claim 1, in which the tape guiding elements are rollers.

3. Tape handling apparatus comprising: a work surface; a tape storage reel canted at an angle with respect to the work surface; means for guiding tape along the work surface; and a pair of cylindrical elements for guiding tape between the canted reel and the work surface, one of the elements being oriented perpendicular to the plane in which the center line of the tape on the reel lies, the other element being oriented perpendicular to the plane in which the center line of the tape guided along the work surface lies, and both elements being located such that the center line of the tape extending between the guiding elements substantially coincides with the line of intersection of the planes.

4. The apparatus of claim 3, in which the tape guiding elements are rollers.

5. In a multiple station tape handling system the combination comprising: a stationary frame; a deck plate adapted to accommodate tape handling components; a plurality of pairs of coaxially arranged tape storage reels, one pair corresponding to each station; a drive assembly for each pair of reels mounted on one of the beams to provide torque to the pair; and a supporting structure mounted to the frame, the supporting structure supporting the deck plate a predetermined fixed distance from the structure and supporting the drive assemblies so as to cant the pairs of reels at a predetermined angle with respect to the deck plate without direct connection thereto.

6. The system of claim 5, in which the supporting structure is mounted to the frame by vibration isolator means.

7. In a multiple station tape handling system the combination comprising: a stationary frame; a plurality of rigid beams one corresponding to each station; a supporting structure mounted to the frame, the supporting structure having a rigid, tubular hub from which the rigid beams for each station radially extend; a deck plate adapted to accommodate tape handling components secured to one end of the hub; a plurality of pairs of coaxially arranged tape storage reels, one pair corresponding to each station; and a drive assembly for each pair of reels mounted on one of the beams to provide torque to the pair.

8. The combination of claim 7, in which the supporting structure is mounted to the frame by vibration isolator means.

9. The combination of claim 7, in which each drive assembly includes two motors, one for each reel of the pair, the motors hanging in balanced relationship on opposite sides of the corresponding beam.

10. The combination of claim 7, in which the supporting structure has four beams placed 90 degrees apart, the outer ends of the beams being mounted to the frame by vibration isolator means.

11. The combination of claim 7, in which each beam has a pair of pads with precisely machined surfaces on which the drive assemblies rest.

12. The combination of claim 7, in which the drive assemblies are mounted on the beams so the reels of each pair are canted at an angle with respect to the deck plate such that tape extends upwardly from one reel toward the deck plate and tape extends downwardly from the other reel toward the deck plate.

13. The combination of claim 7, in which the drive assembly comprises: two motors, one for each reel; a hollow outer shaft coupling one motor to one of the reels; an inner shaft coupling the other motor to the other reel, the inner shaft extending beyond the outer shaft at one end to permit application of torque from the motor thereto; means for supporting the inner and outer shafts in axial alginment and relatively rotatable relationship with respect to one another; means for supporting the inner shaft at a point along the extension beyond the point of application of torque in a predetermined, relatively rotatable relationship with respect to the supporting structure; and means for supporting the outer shaft in a predetermined, relatively rotatable relationship with respect to the supporting structure.

14. The combination of claim 13, in which the pairs of reels are each canted at an angle with respect to the deck plate such that tape extends upwardly from one reel toward the deck plate and tape extends downwardly from the other reel toward the deck plate; means individual to each pair of reels for guiding tape in a direction of travel parallel to one surface of the deck plate; and a pair of cylindrical elements individual to each reel for guiding tape between the reel and the common work surface, one of the elements being oriented perpendicular to the plane in which the center line of the tape on the reel lies, the other element being oriented perpendicular to the plane in which the center line of the tape guided along the surface of the deck plate lies, and both elements being located such that the center line of the tape extending between the elements substantially coincides with the line of intersection of the planes.

15. In a tape handling system the combination comprising: a pair of coaxially arranged reels; a motor corresponding to each reel; an inner shaft coupling one of the motors to one of the reels; a hollow outer shaft coupling the other motor to the other reel; means for supporting the inner and outer shafts in axial alignment and relatively rotatable relationship with respect to one another, the inner shaft extending beyond the outer shaft at one end; means located at a point along the extension of the inner shaft for supporting the inner shaft in a predetermined, relatively rotatable relationship with respect to the frame; means for supporting the outer shaft in a predetermined, relatively rotatable relationship with respect to the frame; and means for applying torque from the motors to the shafts such that torque is applied to the inner shaft at a point along the extension between the means for supporting the inner shaft with respect to the frame and the end of the outer shaft.

16. The combination of claim 15, in which the means for supporting the inner and the outer shafts with respect to one another comprises at least two bearings located near opposite ends of the outer shaft.

17. Apparatus for transporting tape along first and second intersecting planes comprising: a first cylindrical tape guiding element oriented perpendicular to the first plane; a second cylindrical tape guiding element oriented perpendicular to the second plane; a length of tape; means for guiding the tape so it is wrapped around the first and second elements and its center line lies in the first and second planes, the elements being located such that the center line of the tape extending between the elements substantially coincides with the line of intersection of the planes, and means for transporting the tape past the elements.

18. The apparatus of claim 17, in which the first and second elements are rollers.

19. In a tape handling system the combination comprising: a pair of coaxially arranged reels; a motor corresponding to each reel; an inner shaft coupling one of the motors to one of the reels; a hollow outer shaft coupling the other motor to the other reel; means for supporting the inner and outer shafts in axial alignment and relatively rotatable relationship with respect to one another; means for supporting the inner shaft in a predetermined, relatively rotatable relationship with respect to the frame; means for supporting the outer shaft in a predetermined, relatively rotatable relationship with respect to the frame; and a beam to support the reels, the motors, and the shafts, the motors hanging in balanced relationship from either side of the beam and the shafts lying over the beam.

20. The combination of claim 7, in which a vacuum pump communicates with the other end of the hub; vacuum columns are mounted on the deck plate; and the vacuum columns are connected to the pump through a hole in the deck plate at the one end of the hub, the interior of the hub serving as a reservoir for the pump.

References Cited

UNITED STATES PATENTS

| | | | |
|---|---|---|---|
| 2,732,144 | 1/1956 | Jones | 242—55.12 |
| 3,002,706 | 10/1961 | Flan et al. | 242—68.3 |
| 3,107,279 | 10/1963 | Hanes et al. | 179—100.2 |
| 3,345,007 | 10/1967 | Rayfield | 242—55.12 |

LEONARD D. CHRISTIAN, *Primary Examiner.*

U.S. Cl. X.R.

226—118